United States Patent Office 3,499,788
Patented Mar. 10, 1970

3,499,788
METHOD IN THE MANUFACTURE OF AN
EXCHANGER PACKING FOR TWO FLUIDS
Ola Glav, Vallentuna, Sweden, assignor to Carl Munters
& Co., Stocksund, Sweden, a corporation of Sweden
No Drawing. Filed Mar. 2, 1966, Ser. No. 531,283
Claims priority, application Sweden, Mar. 2, 1965,
2,680/65
Int. Cl. C03c 25/02
U.S. Cl. 117—126          5 Claims

ABSTRACT OF THE DISCLOSURE

Heat and moisture exchanger packing assembled into a cellular body from coherent corrugated asbestos fiber sheets, and coated with insoluble inorganic substance and heated sufficient to drive off water of crystallization from the asbestos fiber and fuse the inorganic bonding material upon the fiber.

---

This invention relates to a method in the manufacture of an exchanger packing or body, preferably for heat and/or moisture, composed of thin layers which directly or, if desired, indirectly through distance pieces, bear against one another at mutually spaced positions and therebetween form channels or passageways open from end to end and extending through the packing. At least every alternate layer may be corrugated, the places of contact being formed by the ridges of the corrugations. An important field of application of the invention is the transfer of heat and/or moisture between two air flows. The exchanger packing can in this mode of application be designed as a rotor which moves in a closed path between two passages transgressed by both of the air currents. The exchanger packing may, however, instead also be stationary, valve members being adapted to produce various flow paths through the same.

It is known in the prior art to manufacture such exchanger packings of ceramic material. The material is then applied in plastic form onto a web of a metal or cloth of such a character that it disappears when the ceramic material is heated to sintering temperature. The purpose of the web is thus merely to keep the ceramic material evenly distributed in the form of a layer during the manufacturing process.

Further, it is known in the prior art to produce the layers from asbestos fibre. The fibres are matted together and are usually supplied with an organic binding agent in order to improve the weak strength inherent to the asbestos fibres themselves. It is known to remove the organic constituents and replace them with inorganic substances, the layer becoming non-combustible and at the same time obtaining increased strength even in a wet state. In this respect particular attention has been paid to the point of crystallization of the asbestos fibres in that it has been found that the fibres, if heated to too high a temperature, may loose the crystal water and become very brittle. The substance supplied has thus been of a type which becomes active under the critical temperature, which lies between 400–600° C. The inorganic substance that strengthens the asbestos structure has, i.a., been applied to the fibre material as a dispersion, e.g. in water.

Further, it is known to produce a deposit on the asbestos layer by treating said layer with two substances which react chemically with one another, such as water glass and calcium chloride. In this method, however, stronger contraction stresses may appear in the finished exchanger element.

Beyond the present state of the art the invention is mainly characterized by the feature that at least one layer treated with at least one inorganic substance is heated to a temperature which is higher than the point of crystallization of the asbestos, said substance being such that it at that temperature forms a skeleton considerably improving the strength of the layer. The substance is preferably applied to the layer in an aqueous solution or aqueous dispersion.

The separate asbestos fibre is composed of bunches of threads of extremely small diameter. At the point where the crystallization temperature is exceeded the crystal water begins to depart from the fibres whilst at the same time the residue present in the fibres, after evaporation of the liquid, becomes more and more transformed until it takes over the carrying functions of the layer structure. The final result is a mechanical hardness and strength which is very satisfactory and which remains even should the exchanger packing be brought into contact with water. The asbestos fibres can be closely combined with the substance in consideration to a more or less homogeneous, hard skeleton.

Prior to carrying out the treatment according to the invention the exchanger packings are built up by providing the layer webs with corrugations or protuburances and joining them together by means of a suitable binding agent such as water glass. In this way it is possible to proceed so that a corrugated asbestos sheet and a plain asbestos sheet are first joined together by means of such an adhesive substance to a so-called "single waved structure" which is subsequently coiled up, without the assistance of binding agents, to form a cylindrical body of any desired diameter. This body is just firm enough to be able to be immersed in a solution, e.g. in water.

It is preferred to perform the treatment of the exchanger packing according to the invention by means of two substances which are soluble in a liquid, such as water, and which together form an insoluble deposit which sinters or melts at a temperature above the crystallization temperature of the asbestos, such as about 800–1,100° C., for example, 1,000° C. Aluminum chloride and sodium silicate in aqueous solution can be mentioned as an example of such substances which together form a deposit of aluminum silicate which on being heated forms a melt of aluminum and a silicon oxide (kaolin).

As is evident from the above, the exchanger packing according to the invention is given a high degree of resistance to heat and is thus not influenced by, e.g., the temperature of exhaust gases prevailing in gas turbines. Further, the exchange packing can be made completely non-hygroscopic.

According to another embodiment, the exchanger packing can be saturated with a dispersion of substance such as refractory cement slurried in water. The dispersion is of sufficiently low viscosity to enable it to penetrate all the channels of the exchanger packing and, subsequent to evaporation and heating to approximately 1,000° C., forms a thin coating on and around the asbestos fibres.

The bonding together of the sheets or foils at the places of contact may be effected by means of conventional methods and glueing agents, preferably of inorganic kind such as water glass.

Due to its wealth of extremely fine fibre threads the asbestos layer has an extraordinarily wide exposed surface area per unit of surface. Even if the asbestos fibres themselves, consequent to the high temperature treatment according to the invention, lose their original strength, the structure is to a large degree retained which means that the transfer properties for heat as well as moisture per unit of surface area of the layer become extraordinarily great.

The invention is also suited for use in conjunction with cooling towers for producing the contact packings in the same.

What I claim is:

1. A method of manufacture of a heat and moisture exchanger packing for two fluids having layers of corrugated sheets of asbestos fibre which bear against one another at mutually spaced places and form therebetween passageways open from end to end and extending through the packing, the strength of said layers being increased by coating said fiber with inorganic siliceous substance, and heating said coated packing to a temperature higher than the point of crystallization of the asbestos exceeding about 600° C., said temperature being sufficient to fuse said coating, the said siliceous inorganic substance forming a bonding skeleton for the residual fibrous mass, considerably improving the strength of the layers comprising said exchanger packing.

2. The method of claim 1, wherein the siliceous bonding substance is water soluble and is applied to the layers in an aqueous solution.

3. The method of claim 1, wherein the siliceous inorganic substance is applied to the layers in an aqueous dispersion.

4. The method as defined in claim 1 wherein two substances, one being a water soluble silicate and the other being another water soluble salt of a metal whose silicate is water insoluble, are each applied as aqueous solutions to the layers which react with one another upon the fiber to form an insoluble coating.

5. The method as defined in claim 4 wherein the two interactable substances coated upon the fiber are respectively water glass and an aqueous solution of an aluminum salt.

References Cited

UNITED STATES PATENTS

| | | |
|---|---|---|
| 3,231,409 | 1/1966 | Munters. |
| 2,804,908 | 9/1957 | Spooner et al. _____ 161—205 |

ALFRED L. LEAVITT, Primary Examiner

M. F. ESPOSITO, Assistant Examiner

U.S. Cl. X.R.

117—46; 156—210; 161—133, 205